Sept. 20, 1932.  D. W. SMITH  1,878,902
TWINE TENSION DEVICE FOR GRAIN BINDERS
Filed Aug. 19, 1930
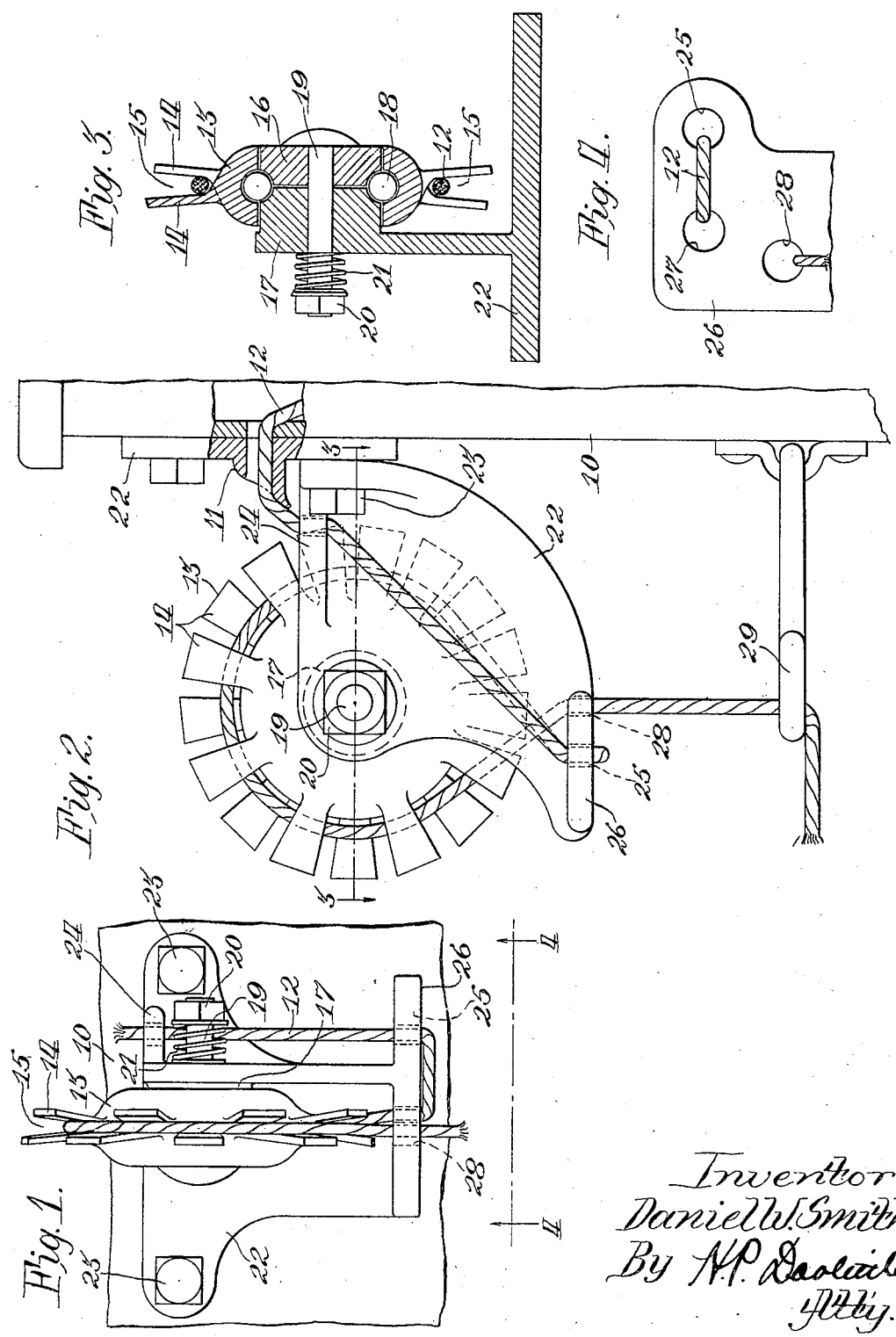
Inventor
Daniel W. Smith
By N.P. Doolittle
Atty.

Patented Sept. 20, 1932

1,878,902

UNITED STATES PATENT OFFICE

DANIEL W. SMITH, OF OAK PARK, ILLINOIS, ASSIGNOR TO INTERNATIONAL HARVESTER COMPANY, A CORPORATION OF NEW JERSEY

TWINE TENSION DEVICE FOR GRAIN BINDERS

Application filed August 19, 1930. Serial No. 476,357.

The invention relates to a twine tension device for grain binders.

Grain binders utilize a can in which is placed twine that is led to the binder needle for tying cut grain into bundles. Such twine as it plays loosely out of the can, would snarl and tangle objectionably, if a tension device were not associated with the twine to hold it fairly taut while the same is threaded automatically through the needle.

Accordingly, it is the object of this invention to provide an improved twine tension device for this purpose, which will be simple in construction, cheap to produce, and not likely to get out of order.

Still another important object is to provide such a device, with which is associated a regulating means for changing the tension on the twine.

Other objects will be apparent as the disclosure progresses.

These desirable objects may be achieved by the example of the invention herein chosen for purposes of illustration.

In the sheet of drawing:

Figure 1 is a front elevational view of a tension device connected to a twine can;

Figure 2 is a side elevational view;

Figure 3 is a sectional view through the tension device as seen along the line 3—3 appearing in Figure 2; and, Figure 4 is a detail, elevational view of a part of the bracket supporting the tension device when viewed from the line 4—4, looking in the direction of the arrows appearing in Figure 1.

The tension device herein disclosed is associated with a twine can that carries the same, although obviously it may be located beneath the binder deck or in some other convenient location without in any way affecting its operation whatsoever.

A twine can is shown at 10 having a spout 11, through which the twine 12 is led out of the can in the usual manner. The strand of twine, as is understood in this art, is threaded through the binder needle, which pulls the strand of twine out of the can as it is needed. To keep the twine taut as it is led to the needle, a wheel member 13 is provided, said member having radially, outwardly, oppositely extending, and alternately arranged, spaced wings 14 to provide a groove 15 that receives the strand of twine. As shown in Figure 3, this wheel 13 is centrally hollowed out to fit and turn over a circular block 16 and another similar block 17, there being an annular series of spaced balls 18 provided in an appropriate annular groove formed in the two blocks 16 and 17 and on the inside of the wheel 13. The parts 16 and 17 are separated for relative movement with respect to each other endwise and are connected together by means of a bolt 19 carrying a nut 20 at one end with a spring 21 coiled around the bolt 19 between the outer face of the piece 17 and the nut 20.

Obviously, by taking up on the nut the spring tension may be changed and the pressure between the parts 16 and 17 can be varied to tighten or loosen said members with respect to the balls 18 and, in this fashion, the parts can be manually set to vary the frictional drag on the wheel 13, so that the same may turn freely, or not so freely, as desired. The part 17 is formed as part of a bracket 22, which at 23 is appropriately connected in this embodiment of the invention to the twine can 10, as shown best in Figure 2.

The strand of the twine 12 emerging from the can 10 is led through the spout 11 and thence through an eye 24 formed on the bracket 22; thence, diagonally downwardly and outwardly, as shown in Figure 2, through an eye 25 formed in an extension 26 at the bottom of the bracket 22; thence, laterally to an eye 27 in the same extension 26; thence, back around the wheel 13 toward the can 10, as shown in Figure 2, into the groove 15 of said wheel 13; thence, once around said wheel and downwardly through an eye 28 in the extension 26; and, thence, finally downward through an eye 29 carried by the twine can 10, from whence the twine, appropriately tensioned, leads to the eye of the binder needle.

From this disclosure it can be seen that the nut 20 permits of varying the friction between the parts 17 and 16 to cause the balls 18 to impart a frictional drag on the reel 13 to rotate freely or not so freely, as is desired. The wings 14 formed as shown and described provide a structure which best functions to receive the twine and prevent slippage thereof around the reel. Further, if the needle should cause a sudden uneven or jerky pull upon the strand of twine, the reel 13 could momentarily turn more freely because the parts 16 and 17 could yield apart against the pressure of the spring 21, thus functioning to prevent breakage of the twine, which is very important, because, if the twine were to break, annoying delays result in rethreading the twine through the binder mechanism of the binder. From this disclosure it must now be apparent that a practicable structure is provided for the purpose stated, which achieves all of the objects heretofore recited.

It is the intention to cover all such changes and modifications of the example herein shown as do not depart from the spirit and scope of the invention as is indicated by the scope of the appended claims.

What is claimed as new is:

1. A twine tension device for grain binders comprising an attaching bracket, a pin carried by the bracket, a circular block formed integral with the bracket and concentric with the pin, a block mounted on said pin for relative endwise movement, means for yieldingly forcing the blocks together, a wheel turnable around the blocks, friction balls arranged between the blocks and wheel to impart a drag on the wheel, said wheel provided with a groove to receive the twine, and means for leading the twine around said wheel.

2. A twine tension device for grain binders comprising an attaching bracket formed with a circular integral block, a pin carried by the bracket and passed concentrically through the circular block, a second block mounted on said pin for relative endwise movement, a spring on the pin for yieldingly forcing the blocks together, a wheel turnable around the blocks, friction members arranged in grooves between the blocks and wheel to impart a drag on the wheel, said wheel provided with a groove to receive the twine, and means for leading the twine around said wheel.

3. A twine tension device for grain binders comprising an attaching bracket formed with a circular block, a pin passed through the block, a second circular block carried on the pin, a wheel turnably mounted on both blocks, there being a grooved passage-way formed between said two blocks and inner periphery of the wheel, friction clutch balls in said grooved passage-way, a head at one end of the pin to hold the two blocks together, and adjustable tension means on the other end of the pin to vary the frictional drag of the balls on the wheel.

In testimony whereof I affix my signature.
DANIEL W. SMITH.